United States Patent
Park et al.

(10) Patent No.: US 7,295,534 B2
(45) Date of Patent: Nov. 13, 2007

(54) METHOD AND APPARATUS FOR A HYBRID NETWORK DEVICE FOR PERFORMING IN A VIRTUAL PRIVATE NETWORK AND A WIRELESS LOCAL AREA NETWORK

(75) Inventors: Tae Gon Park, Suwon-si (KR); Hyunwoo Cho, Sungnam-si (KR); Kab Joo Lee, Sungnam-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 644 days.

(21) Appl. No.: 10/811,611

(22) Filed: Mar. 29, 2004

(65) Prior Publication Data

US 2004/0208155 A1    Oct. 21, 2004

(30) Foreign Application Priority Data

Apr. 17, 2003    (KR) ................ 10-2003-0024237

(51) Int. Cl.
*H04Q 7/20*    (2006.01)

(52) U.S. Cl. .................. 370/328; 370/338; 370/400; 370/401

(58) Field of Classification Search ............... 370/310, 370/328, 338, 351, 380, 400, 389, 395.1, 370/395.53, 395.5, 401, 402, 404, 405, 406, 370/411; 726/2, 3, 11, 14, 15; 709/223, 709/229, 227; 455/403, 552.1

See application file for complete search history.

(56) References Cited

U.S. PATENT DOCUMENTS

| | | | |
|---|---|---|---|
| 6,112,269 A * | 8/2000 | Nordling | 710/69 |
| 2003/0035471 A1* | 2/2003 | Pitsoulakis | 375/222 |
| 2004/0071121 A1* | 4/2004 | Ishidoshiro | 370/338 |
| 2004/0215957 A1* | 10/2004 | Moineau et al. | 713/153 |
| 2006/0133329 A1* | 6/2006 | Lewis et al. | 370/338 |

* cited by examiner

*Primary Examiner*—Jean Gelin
(74) *Attorney, Agent, or Firm*—F. Chau & Assoc., LLC

(57) ABSTRACT

A method and apparatus for a hybrid network device for performing in a virtual private network (VPN) and a wireless local area network (WLAN) are provided. The hybrid network device comprises a VPN module serving as a VPN hardware accelerator in a WLAN module, which performs in the WLAN, wherein the hybrid network device integrates WLAN and VPN capabilities into one device.

17 Claims, 7 Drawing Sheets

METHOD AND APPARATUS FOR A HYBRID NETWORK DEVICE FOR PERFORMING IN A VIRTUAL PRIVATE NETWORK AND A WIRELESS LOCAL AREA NETWORK

BACKGROUND OF THE INVENTION

1. Technical Field

The present invention relates to hybrid network devices for performing in a virtual private network (VPN) and a wireless local area network (WLAN) and, more specifically, to hybrid network devices integrating a VPN module performing as a VPN hardware accelerator in a WLAN module, and methods for driving the same.

2. Discussion of the Related Art

A virtual private network (VPN) establishes a private network on a public switched telephone network (PSTN) or public switched data networks (PSDNs) such as the internet to provide a network line similar to a private local area network (LAN) or a private line using a private branch exchanger (PBX) for users. In addition, the VPN provides a security function for protecting information transmitted over the internet.

Recently, a wireless local area network (WLAN) has been used for communication between corporate users. However, the WLAN has a disadvantage in that it has a weak security function. Therefore, the security function of the VPN has been adapted for use with the WLAN.

VPNs that are used in environments, which include typical wired networks, generally perform a security function with hardware such as a VPN gateway. However, there is no hardware, such as the VPN gateway, for use in a mobile environment. Thus, procedures for implementing the VPN are processed with software. For this, high performance mobile systems are required, but most mobile systems have lower performance speeds than that of typical high performance desktop systems. As a result, system performance is degraded when the VPN, which needs high system performance (e.g., high computer processing speeds), is implemented with software.

In some instances, a VPN hardware accelerator is used to overcome the degradation of system performance. However, mobile systems typically have a limited number of expansion slots. Thus, it is difficult to implement a device embodying WLAN and VPN capabilities into one mobile system.

SUMMARY OF THE INVENTION

In one embodiment of the present invention, a hybrid network device for performing operations in a wireless local area network (WLAN) and operating as a virtual private network (VPN) device by integrating a hardware accelerator of the VPN device into a media access controller (MAC) of a mobile system having WLAN capabilities is provided. In another embodiment, a method for driving the hybrid network device is provided.

In yet another embodiment of the present invention, a hybrid network device comprises a VPN module, a WLAN module, a host interface module (HIF) and a local bus. The VPN module serves as a VPN accelerator for processing data packets transmitted to the VPN from a host of a mobile system. The WLAN module processes data packets transmitted to the WLAN from the host. The HIF transmits or receives data packets between the host and the VPN module or between the host and the WLAN module by interfacing with the host of the mobile system through a host bus. The local bus connects the HIF to the WLAN module and the VPN module.

In another embodiment of the present invention, a method for operating a hybrid network device comprises the following steps.

Data packets transmitted from a host to the hybrid network device are discriminated according to whether an application of a VPN is sent to a device driver of the host. The data packets received from the device driver are processed in an algorithm of the VPN or an algorithm of the WLAN by controlling the device driver in the hybrid network device. The data packets are read from the hybrid network device after completing the algorithm of the VPN or the algorithm of the WLAN. The data packets read from the hybrid network device are transmitted to an internet protocol (IP) stack of the host through a signal process for the VPN in a VPN processor, if the data packets are read from the VPN module. Alternatively, the data packets are transmitted directly to the IP stack if the data packets are read from the WLAN module.

BRIEF DESCRIPTION OF THE DRAWINGS

The aspects of the present invention will become more apparent by describing in detail exemplary embodiments thereof with reference to the attached drawings, in which.

DETAILED DESCRIPTION OF EXEMPLARY EMBODIMENTS

Figure 1:
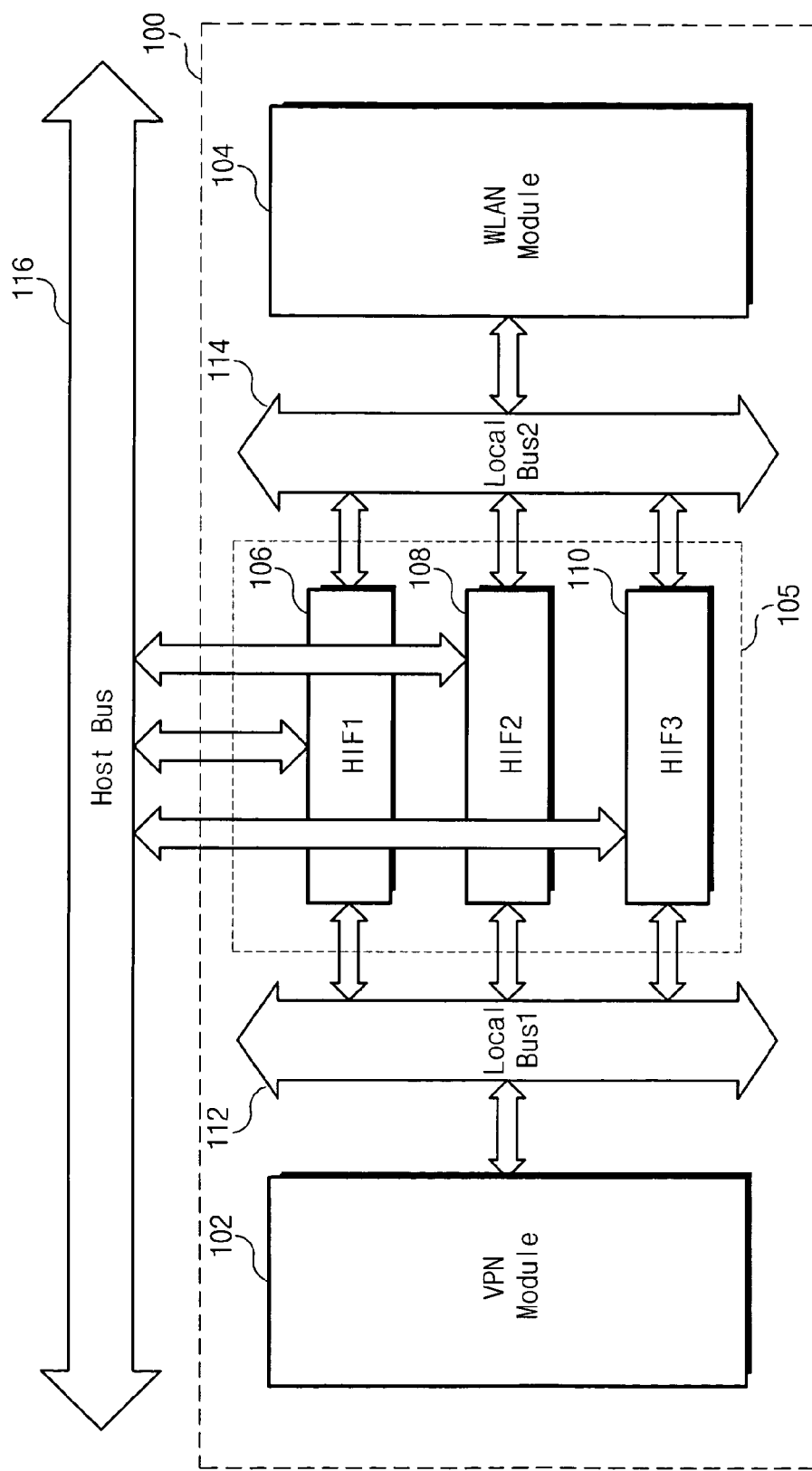
FIG. 1 is a block diagram showing a hybrid network device according to an exemplary embodiment of the present invention.

FIG. 1 is a block diagram showing a hybrid network device 100 according to an exemplary embodiment of the present invention. The hybrid network device 100 includes a virtual private network (VPN) module 102, a wireless local area network (WLAN) module 104, a host interface module 105 and local buses 112 and 114. The hybrid network device 100 may be embodied in an integrated chip or a system. Because there are several interfaces in the host interface module 105, the host interface module 105 has a plurality of host interfaces 106, 108 and 110. It is to be understood that the host interface module 105 should have at least one host interface.

The host interface module 105 is connected to the VPN module 102 and the WLAN module 104 through the two local buses 112 and 114, and routes a data packet transmitted from a host 200 (shown in FIG. 2) via a host bus 116 to the VPN module 102 or the WLAN module 104 according addresses of the data packet. For this, the VPN module 102 and WLAN module 104 are classified into different address regions.

The host interface module 105 includes a device interrupt register (not shown) capable of causing an interrupt if there is data to be transmitted from the VPN module 102 or the WLAN module 104 to the host 200. The device interrupt register may provide a plurality of interrupt sources but a host interrupt register (not shown) of the host 200 receives only one register interrupt. Therefore, if there is one or more interrupts in the device interrupt register, the host interrupt register is set and the host 200 reads the device interrupt register to find the interrupt source.

The VPN module 102 also serves as a VPN hardware accelerator for processing portions of the VPN algorithm that deal with, for example, encryption, which can degrade the system's (e.g., the VPN or the WLAN) performance resulting from excessive acquisition requests for resources. The VPN module 102 stores the data packets transmitted from the host 200 in an input buffer (not shown) of the VPN module 102. Then, the data packets stored in the input buffer are processed by the VPN algorithm, and transmitted to the host 200 through an output buffer (not shown) of the VPN module. In addition, the VPN module 102 stores the packet information needed for VPN operation in a specific register (not shown).

The WLAN module 104 includes hardware such as a media access controller (MAC) for performing a WLAN algorithm, a based-band processor (BBP) and a radio frequency (RF) system. In addition, the WLAN module 104 stores data packets transmitted from the host 200 in an input buffer (not shown) to perform the WLAN algorithm, and then transmits the data packets to the host 200 through an output buffer (not shown) in the WLAN module 104 in the same or similar way as the VPN module 102.

Figure 2:
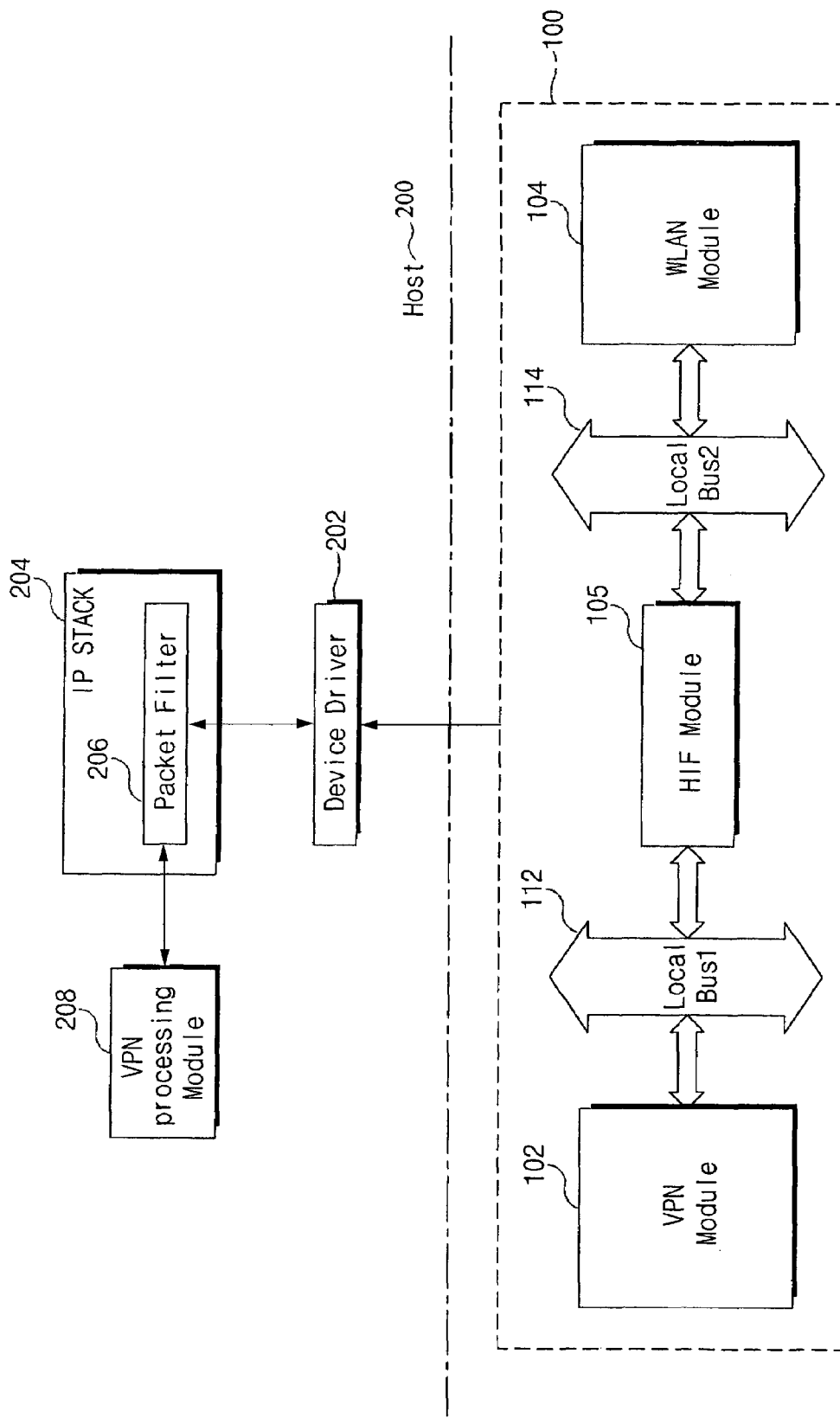
FIG. 2 is a block diagram of the hybrid network device of FIG. 1 and a host showing a method for operating an algorithm of a virtual private network (VPN) or a wireless local area network (WLAN)

FIG. 2 is a block diagram of the hybrid network device 100 of FIG. 1 and the host 200 showing a method for performing an algorithm of a VPN or an algorithm of a WLAN. The operation of FIGS. 1 and 2 will now be discussed with reference to FIGS. 3-7.

Figure 3:
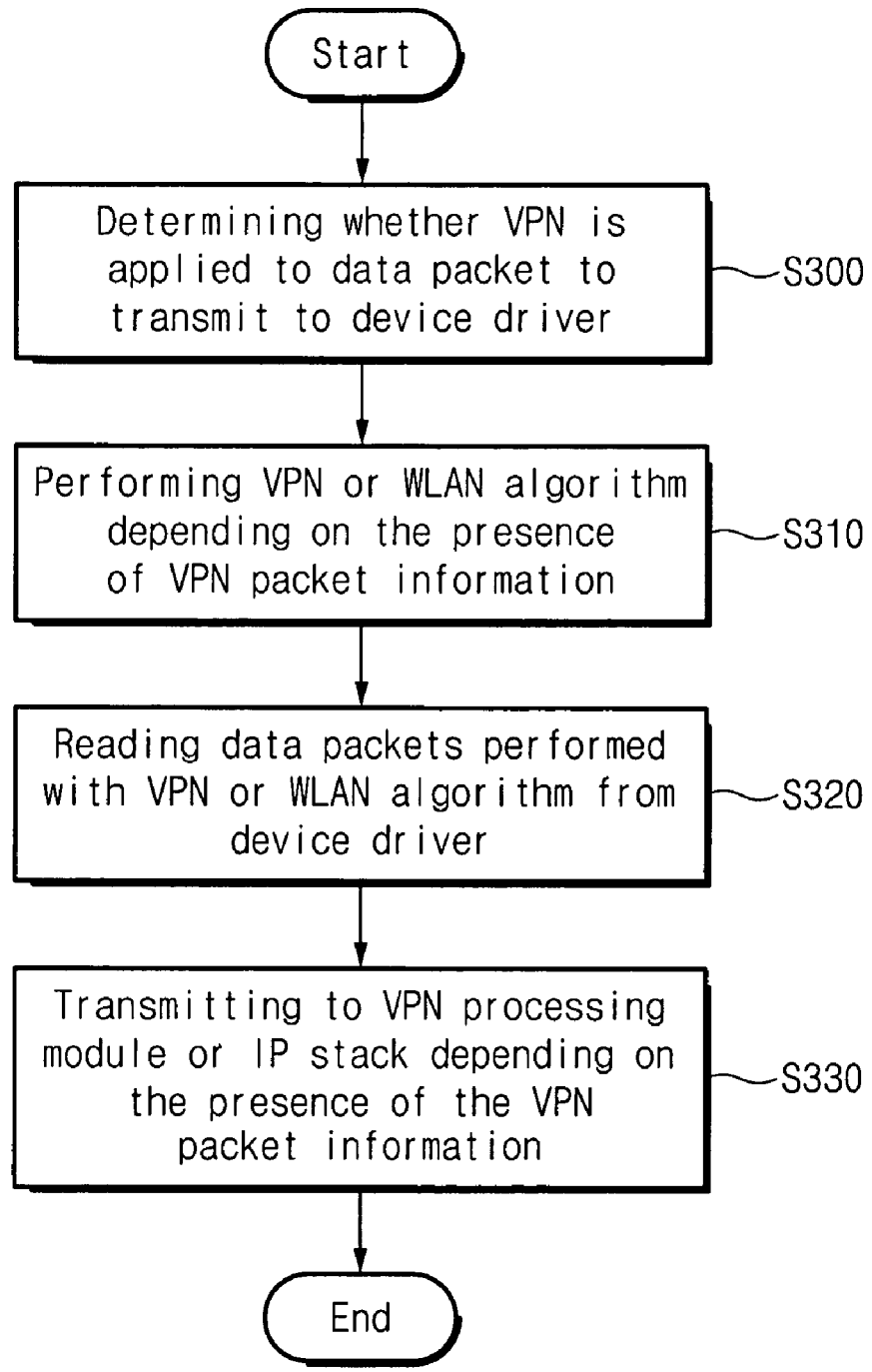
FIG. 3 is a flow diagram showing an operation of the hybrid network device and the host of FIG. 2.

FIG. 3 is a flow diagram showing an operation of the hybrid network device 100 and the host 200 of FIG. 2. Referring to FIG. 3, it is first determined whether or not a VPN is applied to a data packet, then the data packet is transmitted to a device driver 202 (of FIG. 2) (step S300). The device driver 202 transmits the data packet to the hybrid network device 100, and the hybrid network device 100 performs a VPN algorithm or a WLAN algorithm depending on whether there is VPN packet information in the packet (step S310). The data packets processed by the VPN algorithm or the WLAN algorithm are read from the device driver 202 (step S320) and then transmitted to a VPN processing module 208 (of FIG. 2) or an internet protocol (IP) stack 204 (of FIG. 2) depending on whether or not there is VPN packet information (step S330).

Figure 4:
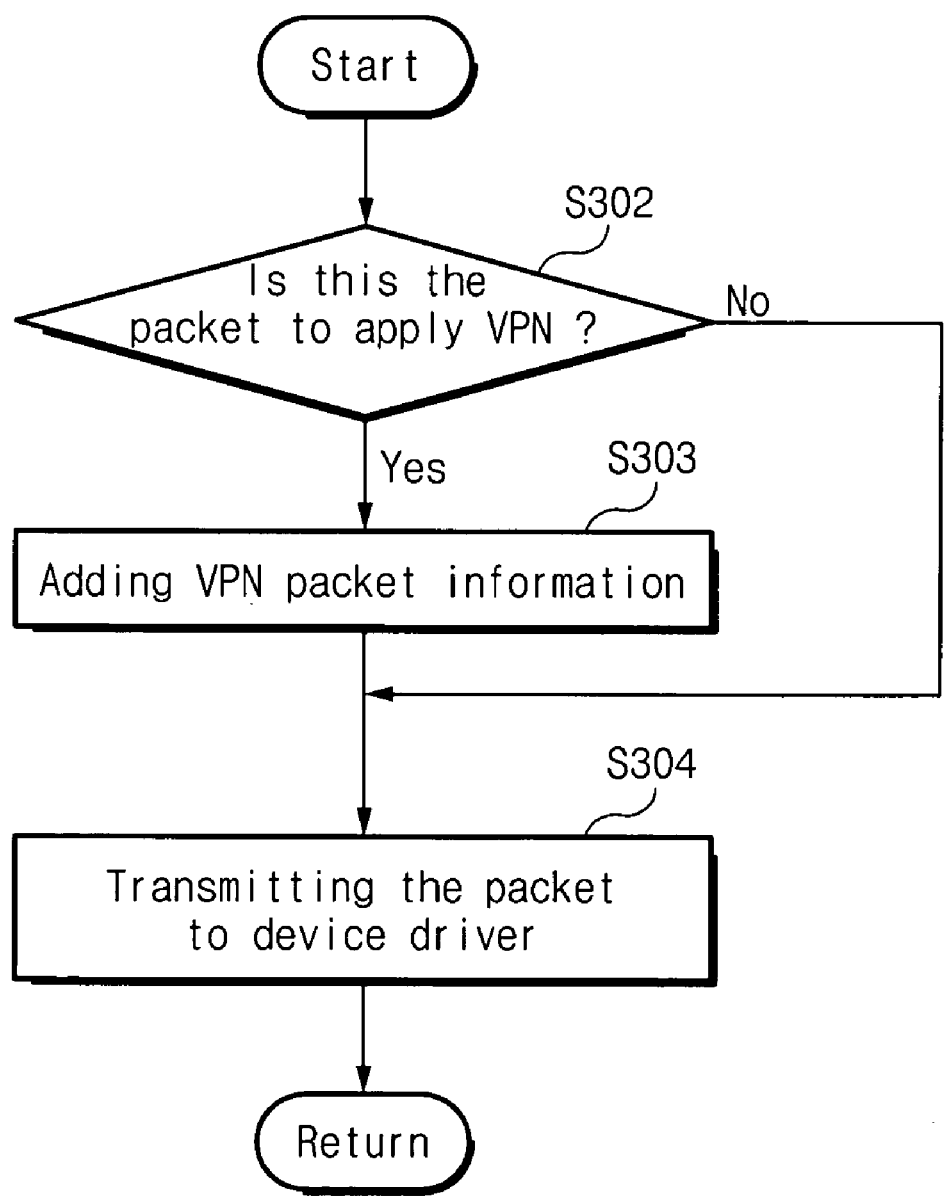
FIG. 4 is a flow diagram showing step S300 of FIG. 3.

FIG. 4 is a flow diagram showing step S300 of FIG. 3. First, data packets that are transmitted between the host 200 and the hybrid network device 100 pass through a packet filter 206 (of FIG. 2) in the IP stack 204 of the host 200. The packet filter 206 may be in the IP stack 204 or connected to a front end or a back end of the IP stack 204.

The packet filter 206 then identifies the data packets transmitted to the hybrid network device 100 from the host 200 to determine whether the data needs to be applied to the VPN (step S302). If the data needs to be applied to the VPN, the VPN data packet information is added thereto (step S303), and then the data is transmitted to the device driver 202 of the host 200 (step S304). If the data does not need to be applied to the VPN, the data is transmitted to the device driver 202 (as is) without adding the VPN packet information (step 304). It is to be understood that the VPN packet information includes information on how to process the data packet received from the VPN module 102.

Figure 5:
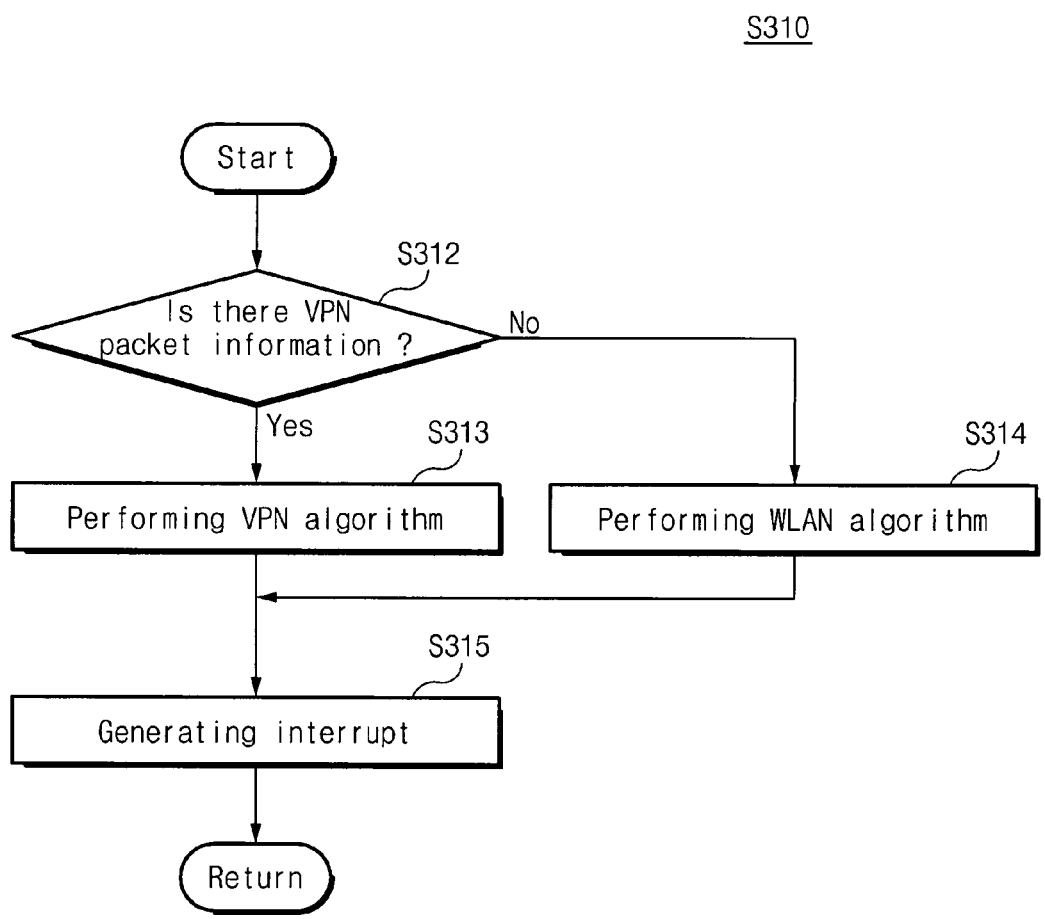
FIG. 5 is a flow diagram showing step S310 of FIG. 3.

FIG. 5 is a flow diagram showing step S310 of FIG. 3. As shown in FIG. 5, the device driver 202 identifies whether the received data packet includes the VPN packet information (step S312). If the data packet includes the VPN packet information, the device driver 202 transmits the data packet to the VPN module 102. The VPN module 102 performs the VPN algorithm and stores the result in an output buffer in the VPN module (step S313). However, if the data packet does not include VPN packet information, the device driver 202 transmits the data packet to the WLAN module 104. The WLAN module 104 carries out the WLAN algorithm and stores the result in an output buffer in the WLAN module 104 (step S314). Meanwhile, if the VPN module 102 or the WLAN module 104 completes the performance of their algorithms, the host interface module 105 generates an interrupt (step S315) and stores it in the device interrupt register in the host interface module 105.

Figure 6:
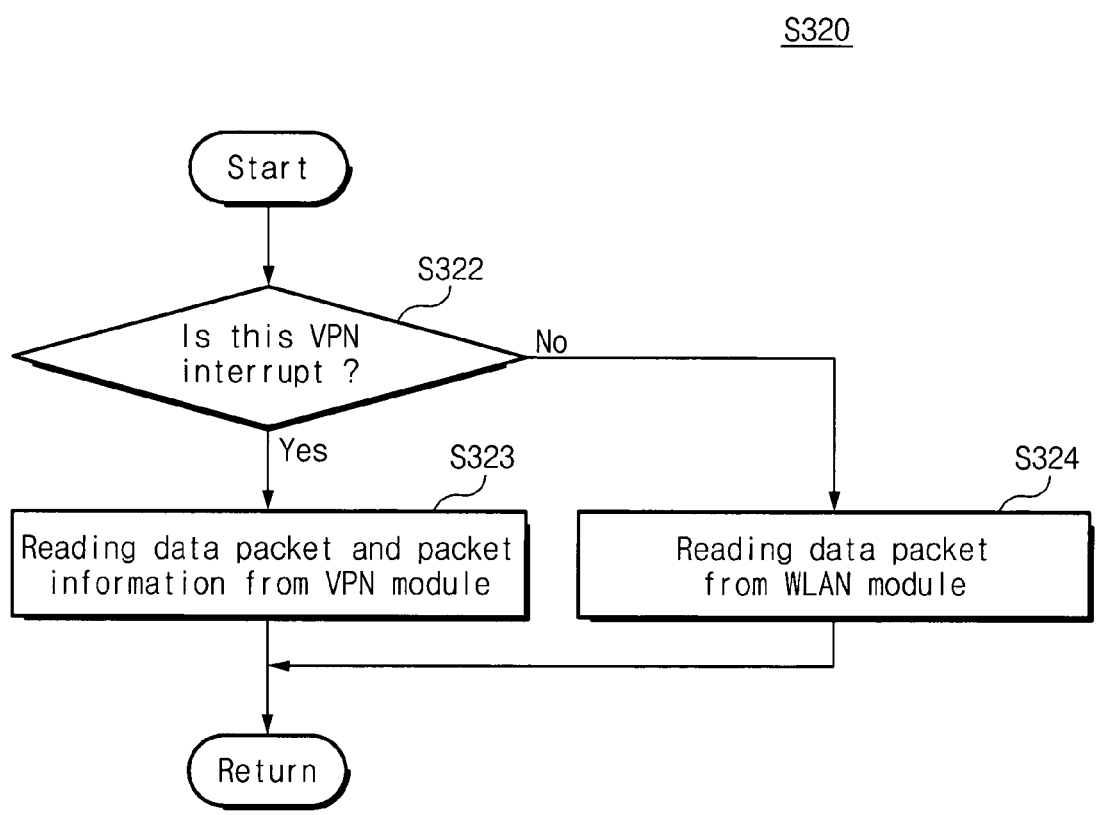
FIG. 6 is a flow diagram showing step S320 of FIG. 3.

FIG. 6 is a flow diagram showing step S320 of FIG. 3. As shown in FIG. 6, when there is an interrupt, the device driver 202 determines whether the interrupt is caused by the VPN module 102 or the WLAN module 104 (step S322). If the interrupt is caused by the VPN module 102, the device driver 202 reads the data packet and the packet information from the output buffer of the VPN module 102 and a register converts the packet information into the VPN packet information (step S323). If the interrupt is caused by the WLAN module 104, the device driver 202 reads the data packet from the output buffer in the WLAN module 104 (step S324). If the interrupt is caused by the VPN module 102 and the WLAN module 104, the device driver 202 gives priority to the module 102 or 104 that read the data first.

Figure 7:
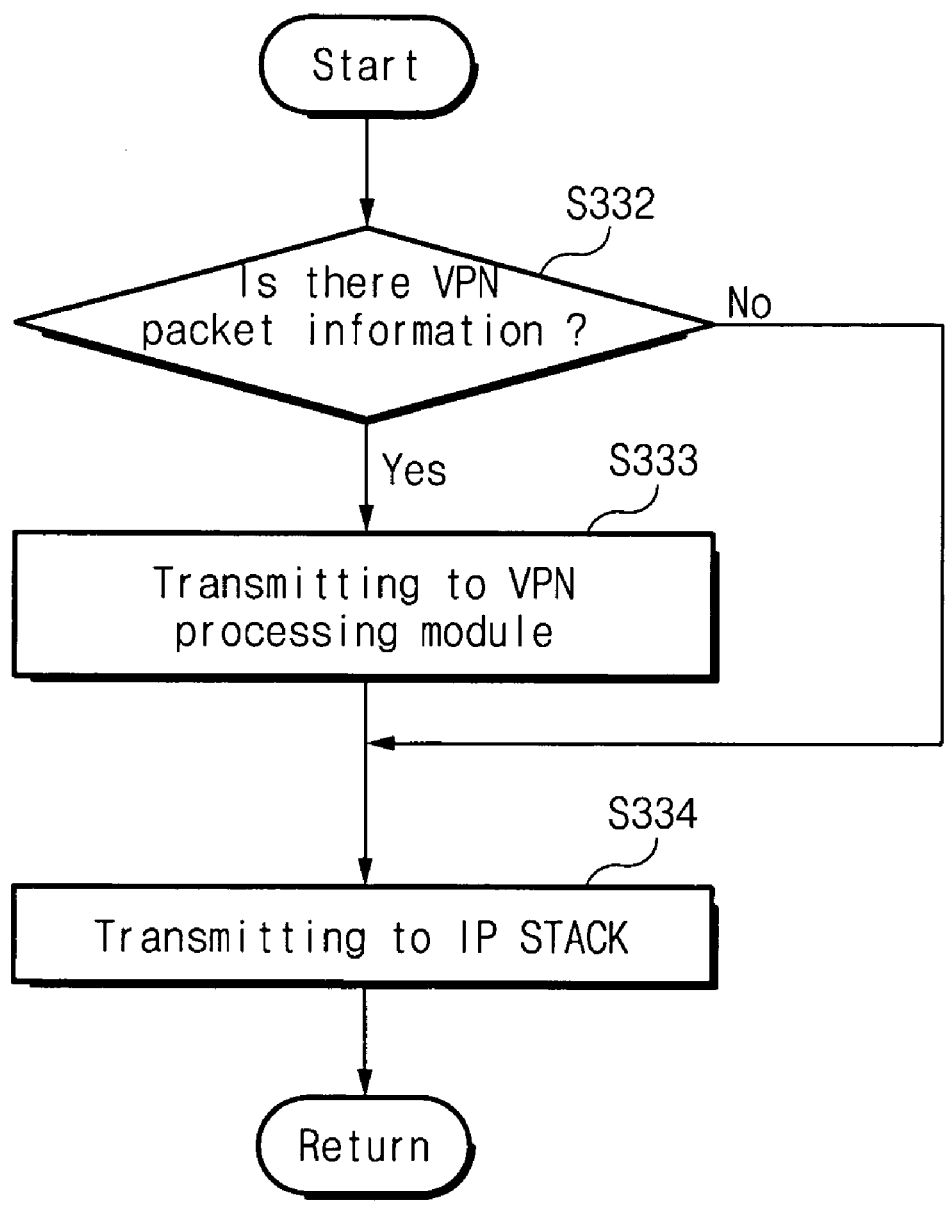
FIG. 7 is a flow diagram showing step S330 of FIG. 3.

FIG. 7 is a flow diagram showing step S330 of FIG. 3. As shown in FIG. 7, a packet filter 206 identifies the data packets read from the VPN module 102 or the WLAN module 104 by the device driver 202 (step S332). If the added VPN packet information is included in the data packets, the data packets are sent to the VPN processing module 208 to be applied with a signal process for the VPN (step S333). When the signal process for the VPN is applied, the data packet is transmitted to the IP stack 204 (step S334) and is applied with the signal process that is applied to general data packets. If there is no added VPN packet information in the data packets, the data packets are transmitted directly to the IP stack 204 without interacting with the VPN processing module 208 (step S334). In other words, the data packets of the WLAN are not transmitted to the VPN processing module 208, but directly to the IP stack 204.

According to the present invention, a VPN module serving as a VPN hardware accelerator is employed in a WLAN module thereby providing a security to function to WLAN devices without sacrificing system performance. In addition, a hybrid network device is capable of performing in a WLAN and a VPN.

While this invention has been particularly shown and described with reference to exemplary embodiments thereof, it will be understood by those skilled in the art that various changes in form and details may be made therein without departing from the spirit and scope of the invention as defined by the appended claims and equivalents thereof.

What is claimed is:

1. A hybrid network device for performing operations in a wireless local area network (WLAN) and operating as a hardware accelerator in a virtual private network (VPN) device, comprising:

a host interface module for transmitting or receiving data packets to or from a host respectively;

a VPN module for processing the data packets received from the host interface module using an algorithm of the VPN module; and a WLAN module for processing the data packets from the host interface module using an algorithm of the WLAN module;

wherein the VPN module comprises:

an input buffer for inputting and storing the data packets transmitted from the host; and an output buffer for processing the data packets stored in the input buffer in one of a VPN and WLAN algorithm and transmitting the processed data packets to the host.

2. The hybrid network device of claim 1, further comprising:

a local bus for connecting the WLAN module and the VPN module to the host interface module.

3. The hybrid network device of claim 2, wherein the local bus comprises:

a first local bus for connecting the WLAN module to the host interface module; and a second local bits for connecting the VPN module to the host interface module.

4. The hybrid network device of claim 1, wherein the VPN module and the WLAN module are divided into different address regions.

5. The hybrid network device of claim 1, wherein the host interface module comprises:

a device interrupt register for causing an interrupt when data transmitted to the host is generated.

6. The hybrid network device of claim 1, wherein the VPN module further comprises:

a register for storing packet information for operating the VPN.

7. The hybrid network device of claim 1, wherein the WLAN module comprises:

a media access controller (MAC) a based-band processor (BBP) and a radio frequency (RF) system.

8. A method for operating a hybrid network device for performing operations in a wireless local area network (WLAN) and operating as a hardware accelerator in a virtual private network (VPN) device, comprising the steps of a) discriminating data packets transmitted from a host in a host packet filter according to whether the data packets are of a VPN, and to transmit the data packets to a device driver of the host;

b) processing the data packets from the device driver using an algorithm of the VPN or an algorithm of the WLAN by controlling the device driver;

c) reading the data packets processed by the device driver after completing the algorithm of the VPN or the algorithm of WLAN; and d) transmitting the data packets read from the hybrid network device to an internet protocol (IP) stack through a signal process for the VPN in a VPN processor if the data packet is the data packet read from the VPN module, or transmitting the data packet directly to the IP stack if the data packet is the data packet read from the WLAN module.

9. The method of claim 8, wherein the host packet filter adds VPN packet information to a data packet that requires application of the VPN packet information.

10. The method of claim 9, wherein the VPN packet information comprises:

information related to processing the data packet and packet information added to the VPN.

11. The method of claim 8, wherein the step b) comprises the steps of:

discriminating the data packets with the VPN packet information and storing the data packets in a buffer and a register of the VPN module; and storing the data packets without the VPN packet information in a buffer of the WLAN module.

12. The method of claim 8, wherein the step c) comprises generating a first interrupt after completing the algorithm of the VPN.

13. The method of claim 8, wherein the device driver reads the data packets from an output buffer of the VPN module when the first interrupt occurs, and converts a result value read from a register of the VPN module into VPN information for adding the read result value to the data packets read from the output bailer.

14. The method of claim 8, wherein the step c) comprises generating a second interrupt after the algorithm of the VPN is completed.

15. The method of claim 8, wherein the device driver reads data packets front an output buffer of the WLAN module when the second interrupt occurs.

16. The method of claim 8, wherein the first and second interrupts are stated in a device interrupt register of the hybrid network device.

17. The method of claim 8, wherein the device driver gives priority to one of the first and second interrupts when the first and second interrupts occur at the same time.

* * * * *